US009309871B2

(12) United States Patent
Marchandise et al.

(10) Patent No.: US 9,309,871 B2
(45) Date of Patent: Apr. 12, 2016

(54) HALL-EFFECT MOTOR IN WHICH THE TEMPERATURE OF THE CATHODE-HEATING DEVICE IS CONTROLLED

(75) Inventors: Frédéric Marchandise, Vernon (FR); Michael Oberg, Port Mort (FR); Nicolas Cornu, Malicorne (FR)

(73) Assignee: SNECMA, Paris (FR)

(*) Notice: Subject to any disclaimer, the term of this patent is extended or adjusted under 35 U.S.C. 154(b) by 517 days.

(21) Appl. No.: 13/643,109

(22) PCT Filed: Apr. 29, 2011

(86) PCT No.: PCT/FR2011/050980
§ 371 (c)(1),
(2), (4) Date: Feb. 5, 2013

(87) PCT Pub. No.: WO2011/135271
PCT Pub. Date: Nov. 3, 2011

(65) Prior Publication Data
US 2013/0125526 A1 May 23, 2013

(30) Foreign Application Priority Data
Apr. 29, 2010 (FR) .................................. 10 53311

(51) Int. Cl.
*B64G 1/40* (2006.01)
*F03H 1/00* (2006.01)
(Continued)

(52) U.S. Cl.
CPC .............. *F03H 99/00* (2013.01); *F03H 1/0031* (2013.01); *F03H 1/0037* (2013.01);
(Continued)

(58) Field of Classification Search
CPC ...... B64G 1/405; F03H 1/0025; F03H 1/0037; F03H 1/0043; F03H 1/0056; F03H 1/0062; F03H 1/0068; F03H 1/0075; H01J 1/15; H01J 1/22; H01J 19/08; H01J 19/16; H01J 37/242; H01J 2201/28; G05D 23/2401
USPC .................. 60/202, 203.1; 313/360.1, 361.1; 315/111.1, 111.91
See application file for complete search history.

(56) References Cited

U.S. PATENT DOCUMENTS 4,086,466 A * 4/1978 Scharlack ...................... 219/494
4,733,530 A 3/1988 Beattie et al.
(Continued)

FOREIGN PATENT DOCUMENTS

CN 87 1 05372 A 6/1988
GB 1 573 679 8/1980

OTHER PUBLICATIONS

Tighe, W., et al., "Performance Evaluation and Life Test of the XIPS Hollow Cathode Heater," American Institute of Aeronautics and Astronautics, pp. 1 to 11, (Jul. 10, 2007) XP 008132035.
(Continued)

Primary Examiner — Phutthiwat Wongwian
Assistant Examiner — William Breazeal
(74) Attorney, Agent, or Firm — Oblon, McClelland, Maier & Neustadt, L.L.P.

(57) ABSTRACT

A Hall effect thruster including: a discharge channel with an open downstream end; a cathode situated outside the discharge channel; an injector system configured to inject atoms of gas into the discharge channel, the injector system situated at an upstream end of the discharge channel and also forming a cathode; a heater device configured to heat the cathode; a measurement mechanism measuring temperature of the heater device, and a regulator circuit regulating the temperature such that the heater device heats so long as its temperature is less than a threshold temperature from which the thruster is capable of starting, and ceases to heat shortly after the threshold temperature has been reached.

9 Claims, 2 Drawing Sheets

(51) Int. Cl.
| | |
|---|---|
| *F03H 99/00* | (2009.01) |
| *G05D 23/24* | (2006.01) |
| *H01J 1/16* | (2006.01) |
| *H01J 1/22* | (2006.01) |
| *H01J 19/08* | (2006.01) |
| *H01J 19/16* | (2006.01) |
| *H01J 1/15* | (2006.01) |

(52) U.S. Cl.
CPC .......... *F03H 1/0062* (2013.01); *F03H 1/0068* (2013.01); *F03H 1/0075* (2013.01); *G05D 23/24* (2013.01); *H01J 1/15* (2013.01); *H01J 1/22* (2013.01); *H01J 19/08* (2013.01); *H01J 19/16* (2013.01); *B64G 1/405* (2013.01)

(56) References Cited

U.S. PATENT DOCUMENTS

| | | | |
|---|---|---|---|
| 5,646,476 | A | 7/1997 | Aston |
| 6,518,693 | B1 * | 2/2003 | Meyer et al. ............... 313/359.1 |
| 2003/0193295 | A1 | 10/2003 | Kaufman et al. |
| 2009/0058305 | A1 * | 3/2009 | Hofer et al. .............. 315/111.91 |

OTHER PUBLICATIONS

Tighe, W., et al., "Hollow Cathode Ignition and Life Model," American Institute of Aeronautics and Astronautics, pp. 1 to 11, (Jul. 10-13, 2005) XP 007916889.

Polk, J., et al., "Emitter Temperature Distributions in the NSTAR Discharge Hollow Cathode," American Institute of Aeronautics and Asronautics, pp. 1 to 9, (Jan. 1, 2005) XP 008131888.

Tighe, W. et al., "Hollow Cathode Ignition Studies and Model Development," The 29$^{th}$ International Electric Propulsion Conference, Princeton University, pp. 1 to 11, (Oct. 31-Nov. 4, 2005) XP 007916828.

International Search Report Issued Aug. 24, 2011 in PCT/FR11/50980 Filed Apr. 29, 2011.

Office Action issued Nov. 27, 2014 in Chinese Patent Application No. 201180021448.6 (submitting English language translation only).

Office Action issued Feb. 4, 2015 in Japanese Patent Application No. 2013-506720 (submitting English language translation only).

* cited by examiner

HALL-EFFECT MOTOR IN WHICH THE TEMPERATURE OF THE CATHODE-HEATING DEVICE IS CONTROLLED

The present invention relates to a Hall effect thruster having a discharge channel with an open downstream end, a cathode situated outside the discharge channel, an injector system suitable for injecting atoms of gas into the discharge channel, the injector system being situated at the upstream end of the discharge channel and also forming an anode, and a heater device suitable for heating the cathode.

A Hall effect thruster is a thruster used for example in the field of space propulsion, since it enables objects to be propelled in the vacuum of space by using a smaller mass of fuel than is possible with fuel-burning engines, and it presents a lifetime that is long, several thousands of hours.

Since the Hall effect thruster is known, its structure and its operating principle are summarized below briefly.

Figure 2:
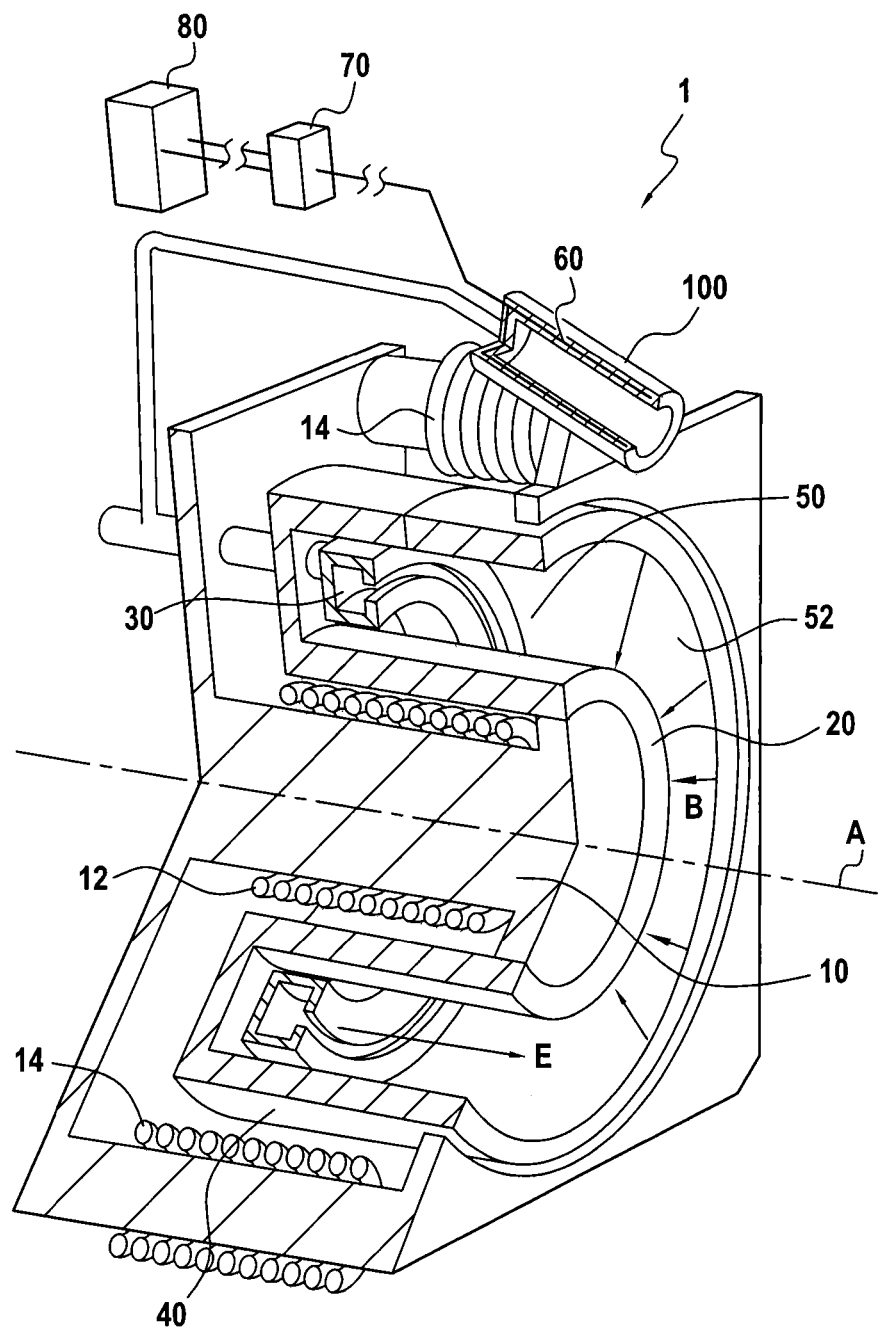

FIG. 2 shows a Hall effect thruster 1 in perspective and partially in section. Around a central core 10 extending along a longitudinal axis A, there is situated a central magnetic coil 12. An inner wall 20 of annular shape surrounds the central magnetic coil 12 and the central core 10. The inner wall 20 is surrounded by an outer wall 40 of annular shape, such that these two walls define between them an annular channel extending along the axis A and referred to as the discharge channel 50.

In the description below, the term "inner" designates a portion closer to the axis A, and the term "outer" designates a portion further from the axis A.

The upstream end of the discharge channel 50 is closed by an injector system 30 that injects atoms of gas into the discharge channel 50, and that also constitutes an anode. The downstream end 52 of the discharge channel 50 is open.

A plurality of peripheral magnetic coils 14 are situated around the outer wall 40. The central magnetic coil 12 and the peripheral magnetic coils 14 serve to generate a radial magnetic field B of intensity that is at a maximum close to the downstream end 52 of the discharge channel 50.

A hollow cathode 100 is situated outside the outer wall 40 and a potential difference is established between the cathode 100 and the anode (injector system 30). The hollow cathode 100 is positioned in such a manner that it ejects electrons in the vicinity of the downstream end 52 of the discharge channel 50.

Within the discharge channel 50, these electrons are directed towards the injector system 30 under the influence of the electric field generated by the potential difference between the cathode 100 and the anode, however some of them remain trapped by the magnetic field B in the vicinity of the downstream opening 52 of the discharge channel 50.

The electrons are thus caused to describe circumferential trajectories in the discharge channel 50 at its downstream opening 52. As a result of collisions with the atoms of inert gas (in general xenon Xe) flowing from upstream to downstream within the discharge channel 50, these electrons ionize the atoms, thereby creating ions. Furthermore, these electrons create an axial electric field E that accelerates the ions from the anode (injector system 30 at the bottom of the channel 80) towards the downstream opening 52, such that these ions are ejected at very high speed from the discharge channel 50 via its downstream end 52, thereby developing the thrust of the thruster.

Starting the thruster requires the cathode 100 to be pre-heated by a heater device 60 up to a threshold temperature that enables the cathode to emit the quantity of electrons that are needed for establishing a critical discharge current $I_{cd}$ in the discharge channel 50 that is sufficient for ionizing the inert gas atoms in the discharge channel. Establishing the discharge current $I_{cd}$ leads to the thruster starting.

In general, reaching this threshold temperature suffices for establishing the discharge current $I_{cd}$.

Under certain unfavorable operating conditions, in order to establish the discharge current $I_{cd}$, it is necessary to send one or more voltage pulses to the cathode after the threshold temperature has been reached.

In practice, the threshold temperature depends on the external conditions outside the thruster, and in particular on the temperature outside the thruster (which may for example lie in the range −50° C. to +70° C.). In order to ensure that the thruster starts under all conditions, a fixed pre-heating duration is selected that is long enough for the highest threshold temperature to be reached, i.e. the temperature corresponding to the most unfavorable external conditions.

Thus, under most circumstances, corresponding to conditions that are favorable or not very unfavorable, pre-heating continues for a duration that is too long. This results in pointless overheating of the cathode up to temperatures that are too high, and thus to damaging the cathode, and thereby reducing the lifetime of the thruster.

The present invention seeks to remedy those drawbacks.

The invention provides a Hall effect thruster in which the duration of pre-heating is optimized so that pointless overheating of the cathode does not occur when the thruster is started, with this applying regardless of the operating conditions of the thruster.

This object is achieved by the fact that the Hall effect thruster further comprises measurement means for measuring the temperature $T_d$ of the heater device, and a regulator circuit for regulating the temperature $T_d$ in such a manner that the heater device heats so long as its temperature $T_d$ is less than a threshold temperature $T_s$ from which the thruster is capable of starting, and ceases to heat shortly after the threshold temperature $T_s$ has been reached.

By means of these provisions, the cathode is not heated for a long time beyond a threshold temperature $T_s$ that corresponds to a temperature at which the thruster is capable of starting. In each thruster operating situation, the cathode is thus heated only for the length of time needed for starting the thruster. This results in minimizing damage to the cathode, and to lengthening the lifetime of the Hall effect thruster.

The invention also provides a method of regulating a Hall effect thruster comprising a Hall effect thruster having a discharge channel with an open downstream end, a cathode situated outside the discharge channel, an injector system suitable for injecting atoms of gas into the discharge channel, the injector system being situated at the upstream end of the discharge channel and also forming a cathode, and a heater device suitable for heating the cathode.

According to the invention, the method comprises the following steps:

a) heating the cathode by using the heater device while simultaneously measuring the temperature $T_d$ of the heater device;

b) continuing the heating of the cathode so long as the temperature $T_d$ is less than a threshold temperature $T_s$ from which the thruster is capable of starting; and c) ceasing the heating shortly after the threshold temperature $T_s$ has been reached.

Figure 1:
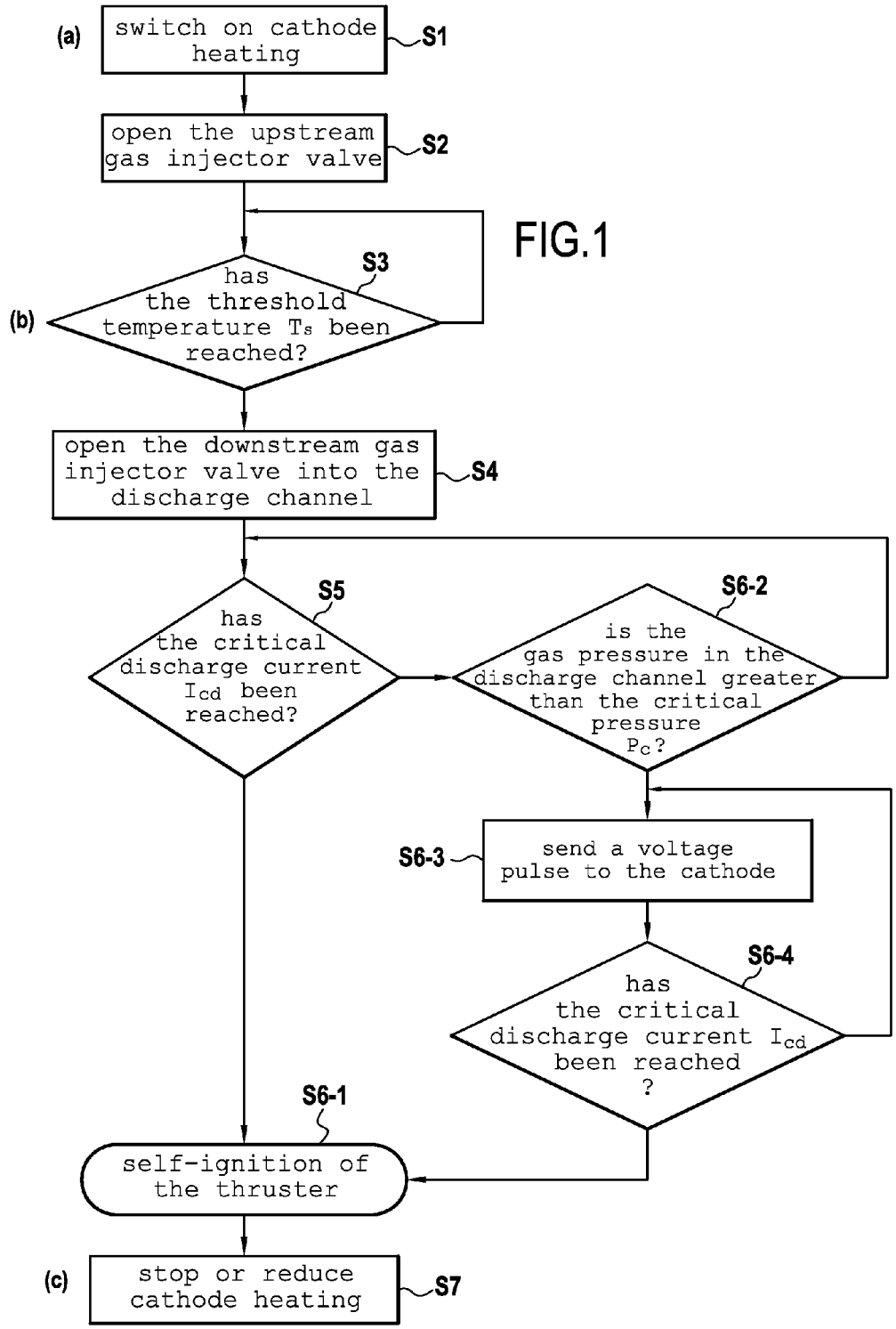

The invention can be well understood and its advantages appear better on reading the following detailed description of an embodiment shown by way of non-limiting example. The description refers to the accompanying drawings, in which:

FIG. 1 is a flow chart showing the sequence of steps in the method of the invention; and FIG. 2 is a perspective view in section of a Hall effect thruster of the invention, showing its general structure.

The general operation of a Hall effect thruster is described above with reference to FIG. 2.

Furthermore, in the Hall effect thruster of the invention, the operation of the thruster is optimized so as to heat the cathode 100 only for the length of time needed for starting the thruster, as explained below.

Thus, the Hall effect thruster includes measurement means 70 for measuring the temperature $T_d$ of the heater device 60, and a regulator circuit 80 for regulating the temperature $T_d$ of the heater device 60.

There follows an explanation of how this regulator circuit 80 operates.

FIG. 1 is a flow chart showing an example of a sequence of steps for starting a Hall effect thruster, these steps comprising the steps of the invention for starting a Hall effect thruster. The sequence of steps is simplified and does not include possible safety mechanisms serving for example to identify erroneous mode of operation during starting of the thruster, and to stop it, should that be necessary. A rectangle □ indicates an action, a lozenge ◇ indicates a test, and an oval ◯ indicates a state. At the outlet from a test, a downward arrow indicates that the test was satisfied, and an arrow to the left indicates that the test was not satisfied.

The steps during starting are referenced as follows:

Step S1: switch on cathode heating.
Step S2: open the upstream gas injector valve.
Step S3: has the threshold temperature $T_s$ been reached?
Step S4: open the downstream gas injector valve into the discharge channel.
Step S5: has the critical discharge current $I_{cd}$ been reached?
Step S6-1: self-ignition of the thruster.
Step S7: stop heating the cathode.
Step S6-2: is the gas pressure in the discharge channel greater than the critical pressure $P_c$.
Step S6-3: send a voltage pulse to the cathode.
Step S6-4: has the critical discharge current $I_{cd}$ been reached?
Step S7: stop or reduce cathode heating.

Initially, the heater device 60 is switched on so as to begin heating the cathode 100 (step S1=step a)). The upstream gas injector valve is then opened (step S2) so as to deliver gas into an enclosure (not shown) ready to be injected into the discharge channel 50.

While the heater device 60 is heating, the temperature of the cathode 100 is measured continuously or at regular intervals so as to detect the moment when this temperature reaches the threshold temperature $T_s$ (step S3).

In practice, the cathode temperature is not measured directly. The temperature $T_d$ of the heater device 60 that is heating the cathode is measured, and this temperature is compared with the threshold temperature $T_s$, it being understood that the temperatures of the heater device 60 and of the cathode 100 are substantially equal. For example, the heater device 60 may be incorporated inside the cathode 100, as shown in FIG. 2.

The heater device may also surround the cathode 100.

The temperature $T_d$ of the heater device 60 is determined by measurement means 70.

For example, the electrical resistivity of the heater device 60 may be measured. The measurement means 70 are then means for measuring electrical resistivity. When the heater device 60 includes a heater element that heats the cathode 100, then it is the electrical resistivity of the heater element that is measured.

Other measurement means are possible, e.g. a thermocouple serving to measure the temperature of the heater device.

When the threshold temperature $T_s$ is reached (step b)), a downstream injector valve situated between the enclosure containing the gas and the discharge channel 50 is opened so as to inject the gas into the discharge channel 50 (step S4).

Under certain circumstances, this downstream injector valve is replaced by a limiter that allows gas to pass automatically from the enclosure into the discharge channel at a limited flow rate, this flow rate being a function of the pressure in the enclosure. Under such circumstances, given that the rise rate for the temperature $T_d$ of the heater device 60 is known, the upstream injector valve is opened at a time that is calculated in such a manner that when the temperature of the heater device 60 reaches the threshold temperature $T_s$, the flow rate of gas through the limiter is sufficient for the thruster to be capable of starting.

The threshold temperature $T_s$ is the temperature that the cathode 100 ought normally to reach for the Hall effect thruster to be capable of starting. Under favorable operating conditions for the thruster, when the threshold temperature $T_s$ is reached, the magnitude of the discharge current (electron flux) emitted by said cathode 100 is then equal to or greater than the critical magnitude for the discharge current $I_{cd}$ at which the inert gas atoms injected into the discharge channel 50 are ionized (step S5), thereby leading to the thruster starting automatically (self-ignition of the thruster—step S6-1). This first mode of starting is shown in FIG. 1.

The threshold temperature $T_s$ is thus a function of this critical magnitude for the discharge current $I_{cd}$.

The threshold temperature $T_s$ depends on the material from which the cathode is made. The thruster starts when the cathode emits a critical magnitude of discharge current $I_{cd}$, i.e. a critical electron flux. The electron density emitted per unit area of the cathode under a given voltage is a function of the material from which the cathode is made, and also of the shape of the cathode. Under favorable operating conditions, and for a cathode made of lanthanum hexaboride ($LaB_6$), the threshold temperature $T_s$ is about 1700° C., for certain shapes.

When the cathode is made of barium oxides impregnated in a tungsten matrix, the threshold temperature $T_s$ is about 1300° C.

Under certain unfavorable conditions, the discharge current emitted by the cathode 100 does not reach the critical magnitude for the discharge current $I_{cd}$ when the cathode temperature 100 rises above the threshold temperature $T_s$. In order to initiate thruster starting, it is then necessary to send a voltage pulse (step S6-3) to the cathode 100 in order to extract more electrons from the cathode 100 and reach a discharge current having a magnitude that is not less than the critical magnitude for the discharge current $I_{cd}$ (step S6-4), so that the thruster starts automatically (step S6-1). If this magnitude is not reached after a first voltage pulse, a second voltage pulse, and if necessary further voltage pulses, is/are delivered until the magnitude is reached.

Nevertheless, sending such pulses is effective only if the pressure $P_g$ of the gas in the discharge channel 50 is greater than a critical pressure $P_c$ (step S6-2). In the context of a Hall effect thruster and in known manner, the pressure $P_g$ of gas in the discharge channel is related to the pressure of gas in the enclosure that is situated immediately upstream and that opens out into the discharge channel 50 (see above). It is this gas pressure in the enclosure that is measured directly.

Voltage pulses are therefore sent to the cathode 100 (step S6-3) only while this additional condition relating to the gas pressure in the discharge channel 50 is satisfied. So long as the pressure $P_g$ of the gas in the discharge channel 50 remains below the critical pressure $P_c$, the cathode 100 continues to be heated and gas continues to be injected into the discharge channel 50.

This state terminates either because the critical discharge current $I_{cd}$ is finally reached, in which case the thruster ignites automatically (step S6-1), or else because the pressure $P_g$ of gas in the discharge channel 50 becomes greater than the critical pressure $P_c$, in which case voltage pulses begin to be sent to the cathode (step S6-2). This second mode of starting is shown in FIG. 1.

Under all circumstances (first mode or second mode), once the thruster has started, which occurs shortly after the cathode 100 has reached the threshold temperature $T_s$, heating of the cathode 100 is switched off or reduced (step S7=step c)). Thus, the cathode 100 is not heated pointlessly and its lifetime is therefore lengthened. For example, the thruster starts a few tens of seconds after the threshold temperature $T_s$ has been reached.

Heating of the cathode 100 is thus stopped a few seconds to a few tens of seconds (e.g. 5 seconds to 300 seconds, and preferably 5 seconds to 60 seconds) after the threshold temperature $T_s$ has been reached.

In a particular circumstance of the second mode, it may be necessary to continue heating the cathode 100 for up to several minutes after the thruster 1 has started. This is a situation in which the thruster has started without the discharge current reaching its critical magnitude $I_{cd}$, and in which the upstream gas pressure is low since the last supplies of gas are being used. Heating of the cathode 100 is then continued for several minutes after the thruster 1 has started while increasing the gas pressure in order to make effective use of these last supplies of gas.

The flow chart of FIG. 1 is merely an example of how a Hall effect thruster can be operated in accordance with the invention. It is possible to implement variations in the starting sequence depending on the type of the thruster, without thereby going beyond the ambit and the spirit of the invention.

The invention claimed is:
1. A Hall effect thruster comprising:
 a discharge channel with an open downstream end;
 a cathode situated outside the discharge channel;
 an injector system configured to inject a atoms of gas into the discharge channel, the injector system being situated at an upstream end of the discharge channel and also forming an anode;
 a heater device configured to heat the cathode;
 a temperature sensor configured to produce measurements of a temperature of the heater device; and
 a regulator circuit configured to regulate the temperature such that the heater device heats until a most recent of the measurements of the temperature reaches a threshold temperature from which the thruster is capable of starting, and ceases to heat shortly after the threshold temperature has been reached,
 wherein the injector system injects the gas into the discharge channel after the most recent of the measurements of the temperature reaches the threshold temperature.

2. A Hall effect thruster according to claim 1, wherein the threshold temperature is a function of a critical magnitude of a discharge current emitted by the cathode, which magnitude corresponds to the thruster starting.

3. A Hall effect thruster according to claim 1, wherein the temperature of the heater device is determined by measuring electrical resistivity of the heater device.

4. A method of regulating a Hall effect thruster according to claim 1, the method comprising:
 heating the cathode by using the heater device while simultaneously taking measurements of the temperature of the heater device;
 continuing the heating of the cathode until the most recent of the measurements of the temperature reaches the threshold temperature from which the thruster is capable of starting; and
 injecting the gas into the discharge channel after the most recent of the measurements of the temperature reaches the threshold temperature.

5. A method of regulating a Hall effect thruster according to claim 4, wherein the threshold temperature is a function of a critical magnitude of a discharge current emitted by the cathode, which magnitude corresponds to the thruster starting.

6. A method of regulating a Hall effect thruster according to claim 5, wherein, after the most recent of the measurements of the temperature reaches the threshold temperature, and while a magnitude of the discharge current emitted by the cathode is less than the critical magnitude for the discharge current and while a pressure of the gas in the discharge channel is less than a critical pressure, the cathode continues to be heated and the gas continues to be injected into the discharge channel.

7. A method of regulating a Hall effect thruster according to claim 5, wherein, after the threshold temperature has been reached by the heater device, and while a magnitude of the discharge current emitted by the cathode is less than the critical magnitude for the discharge current and while a pressure of the gas in the discharge channel is less than a critical pressure, at least one voltage pulse is applied to the cathode until the magnitude of the discharge current becomes equal to the critical magnitude for the discharge current so as to enable the thruster to start.

8. A Hall effect thruster according to claim 1, wherein heating of said cathode is stopped 5 seconds to 300 seconds after the most recent of the measurements of the temperature reaches the threshold temperature.

9. A Hall effect thruster according to claim 1, wherein heating of said cathode is stopped 5 seconds to 60 seconds after the most recent of the measurements of the temperature reaches the threshold temperature.

* * * * *